(12) United States Patent
Rudolph et al.

(10) Patent No.: US 11,504,840 B2
(45) Date of Patent: Nov. 22, 2022

(54) TETHERING SYSTEM FOR POWER TOOL AND BATTERY PACK

(71) Applicant: BLACK & DECKER INC., New Britain, CT (US)

(72) Inventors: Scott Rudolph, Aberdeen, MD (US); Paul S. White, Ellicott City, MD (US); Victor Yang, Suzhou (CN)

(73) Assignee: Black & Decker Inc., New Britain, CT (US)

( * ) Notice: Subject to any disclaimer, the term of this patent is extended or adjusted under 35 U.S.C. 154(b) by 664 days.

(21) Appl. No.: 16/217,187

(22) Filed: Dec. 12, 2018

(65) Prior Publication Data

US 2020/0194747 A1 Jun. 18, 2020

Related U.S. Application Data

(60) Provisional application No. 62/615,048, filed on Jan. 9, 2018.

(51) Int. Cl.
*B25F 5/02* (2006.01)
*H02J 7/00* (2006.01)
(Continued)

(52) U.S. Cl.
CPC ............. *B25F 5/02* (2013.01); *H01M 50/213* (2021.01); *H01M 50/529* (2021.01); *H02J 7/0026* (2013.01)

(58) Field of Classification Search
CPC ......... H01M 2/1055; H01M 2/24; B25F 5/02; B25F 5/00; H02J 7/0026; A45F 5/00; A45F 2200/00; B23D 29/00; B23D 49/00
(Continued)

(56) References Cited

U.S. PATENT DOCUMENTS

| 3,820,360 A | 6/1974 | Best |
| 3,901,058 A | 8/1975 | Best |

(Continued)

FOREIGN PATENT DOCUMENTS

| CA | 2509084 A1 | 12/2006 |
| GB | 2493333 A | 2/2013 |
| WO | 2019060838 A2 | 3/2019 |

OTHER PUBLICATIONS

David, Radu—Extended European Search Report re: corresponding European Patent Appln. No. 18214887.4-1019 / 3517254—dated Jul. 3, 2019—11 pages—Munich Germany.

*Primary Examiner* — Phong H Nguyen
(74) *Attorney, Agent, or Firm* — Scott B. Markow

(57) ABSTRACT

A tethering system for a power tool and battery pack includes a first tethering attachment assembly configured to be attachable to a power tool, and a second tethering attachment assembly configured to be attachable to a battery pack, which is detachably couplable to a battery pack receptacle on the power tool. A first flexible connector has a first end configured to be attachable to the first tethering attachment assembly and a second end configured to be attachable to a stationary object. A second elongated flexible connector has a first end configured to be attachable to the second tethering attachment assembly and a second end configured to be attachable to the first tethering attachment assembly. If the power tool falls and the battery pack becomes detached from the power tool, the first tethering attachment assembly and first flexible connector prevent the power tool from falling more than a first distance from the stationary object, and the second tethering attachment assembly and the second flexible connector prevent the battery pack from falling more than a second distance from the power tool.

20 Claims, 17 Drawing Sheets

(51) Int. Cl.
*H01M 50/213* (2021.01)
*H01M 50/529* (2021.01)

(58) Field of Classification Search
USPC .......................................................... 30/500
See application file for complete search history.

(56) References Cited

U.S. PATENT DOCUMENTS

| | | | | |
|---|---|---|---|---|
| 3,911,671 | A * | 10/1975 | Guillen | A01K 73/06 |
| | | | | 59/89 |
| 3,996,774 | A | 12/1976 | Best | |
| 4,235,544 | A | 11/1980 | Yamada et al. | |
| 4,680,949 | A | 7/1987 | Stewart | |
| 4,791,243 | A | 12/1988 | Ibanez et al. | |
| 5,332,071 | A | 7/1994 | Duncan | |
| 5,373,813 | A | 12/1994 | Da Silveira et al. | |
| 5,394,713 | A | 3/1995 | Harmon | |
| 6,006,860 | A | 12/1999 | Bell | |
| 6,203,355 | B1 | 3/2001 | Neblett et al. | |
| 6,299,040 | B1 | 10/2001 | Matias | |
| 6,315,179 | B1 | 11/2001 | Hillis | |
| 6,418,014 | B1 | 7/2002 | Emerick, Jr. | |
| 6,546,103 | B1 | 4/2003 | Wong | |
| 6,604,390 | B1 | 8/2003 | Nooner | |
| 6,691,537 | B2 | 2/2004 | Tan | |
| 6,691,824 | B2 | 2/2004 | Sharp | |
| 6,959,784 | B2 | 11/2005 | Diggle et al. | |
| 7,204,106 | B2 | 4/2007 | Merrem et al. | |
| 7,231,790 | B2 | 6/2007 | Tonelli | |
| 7,275,941 | B1 | 10/2007 | Bushby | |
| 7,354,304 | B2 | 4/2008 | Livingston | |
| 7,458,135 | B2 | 12/2008 | Mikesell et al. | |
| 7,629,766 | B2 | 12/2009 | Sadow | |
| 8,011,541 | B2 | 9/2011 | Mikesell et al. | |
| 8,042,365 | B2 | 10/2011 | Morrison et al. | |
| 8,167,056 | B2 * | 5/2012 | Ito | B25F 5/02 |
| | | | | 173/171 |
| 8,171,762 | B2 | 5/2012 | Hsiao et al. | |
| 8,222,868 | B2 | 7/2012 | Buckner et al. | |
| 8,322,586 | B2 | 12/2012 | Davis | |
| 8,573,322 | B2 | 11/2013 | Nagasaka et al. | |
| 8,608,142 | B2 | 12/2013 | Von Allmen et al. | |
| 8,661,694 | B2 | 3/2014 | Bijsterveldt et al. | |
| 8,847,086 | B2 | 9/2014 | Wojtak | |
| D718,926 | S | 12/2014 | Minn et al. | |
| 9,004,557 | B2 * | 4/2015 | Knox | B60D 1/60 |
| | | | | 294/82.24 |
| 9,035,596 | B2 | 5/2015 | Sugiura et al. | |
| 9,254,032 | B2 | 2/2016 | Moreau et al. | |
| 9,537,335 | B2 | 1/2017 | Furui et al. | |
| 9,595,839 | B2 | 3/2017 | Furui et al. | |
| 9,635,925 | B2 | 5/2017 | Moreau et al. | |
| 10,531,724 | B2 * | 1/2020 | Woodhams | B25F 5/02 |
| 2003/0029208 | A1 | 2/2003 | Merrem et al. | |
| 2003/0102342 | A1 | 6/2003 | Fogg | |
| 2005/0217084 | A1 | 10/2005 | Behn et al. | |
| 2006/0138182 | A1 | 6/2006 | Carlsson | |
| 2007/0114141 | A1 | 5/2007 | Mikesell et al. | |
| 2008/0163464 | A1 | 7/2008 | Baumann | |
| 2010/0147912 | A1 | 6/2010 | Salentine | |
| 2011/0289786 | A1 | 12/2011 | Bijsterveldt et al. | |
| 2012/0210755 | A1 | 8/2012 | Shafer | |
| 2012/0267403 | A1 | 10/2012 | Ward, Jr. | |
| 2013/0062498 | A1 | 3/2013 | Ito et al. | |
| 2014/0173917 | A1 | 6/2014 | Van Bijsterveldt et al. | |
| 2014/0298664 | A1 | 10/2014 | Van Bijsterveldt et al. | |
| 2015/0164204 | A1 | 6/2015 | Moreau et al. | |
| 2016/0067862 | A1 | 3/2016 | Moreau et al. | |
| 2017/0119137 | A1 | 5/2017 | Circincione et al. | |
| 2020/0227695 | A1 * | 7/2020 | Jones | H01M 2/1022 |

* cited by examiner

TETHERING SYSTEM FOR POWER TOOL AND BATTERY PACK

RELATED APPLICATIONS

This application claims priority, under 35 U.S.C. § 119(e) to U.S. Provisional Patent Application No. 62/615,048, filed Jan. 9, 2018, titled "Tethering System for Power Tool and Battery Pack," which is incorporated by reference.

TECHNICAL FIELD

This application relates to tethering systems for cordless power tools.

BACKGROUND

Power tools are often used at a raised height from the ground, e.g., on scaffolding, ladders, and rooftops. If the power tools are accidentally dropped or fall, they may be damaged and/or cause injuries to workers or bystanders. FIGS. 1A and 1B illustrate an exemplary embodiment of a corded power tool tethering system 10. This system 10 may include a corded power tool 12 having a housing 14 and a power cord 16. A tethering attachment assembly 18 comprises a U-shaped elastic coil or spring element 20 covered by a nylon sleeve 26 with loops 23 at either end of the coil 20. The tethering attachment assembly 18 is removably and pivotally attachable to a metal plate 22 that is bolted the housing 14 by rivets or screws 25 that pass through the loops 23. Together, the tethering attachment assembly 18 and the metal plate 22 form a closed shape. A flexible tethering strap 24 has a first end attachable at one end to the tethering attachment assembly 18 (e.g., by a first carabineer, not shown) and a second end permanently or removably attachable to a stationary object (e.g., by a second carabineer, not shown). If the tool 12 falls from a height, the tethering strap 24 and the tethering attachment assembly 18 prevent the tool 12 from falling by a distance more than approximately a length of the flexible tethering strap 24. In one embodiment, the coil 20 may be configured to resiliently retain its elastic state with application of force up to a limit, and to permanently plastically deformed above a certain force, which reduces the strain and impact load on the power tool housing 14 if the tool 12 falls from a height, as disclosed in U.S. Patent Application Publication No. 2017/0119137, which is incorporated herein by reference. The corded power tool tethering system 10 only works for corded power tools. If a power tool is cordless (i.e., powered by a detachable battery pack), the battery pack also may become detached during the fall, and may fall separately from the power tool.

SUMMARY

In an aspect, a tethering system for a power tool and battery pack includes a first tethering attachment assembly configured to be attachable to at least one attachment point on a power tool and a second tethering attachment assembly configured to be attachable to at least one attachment point on a battery pack, the battery pack being detachably couplable to a battery pack receptacle on the power tool. A first flexible connector has a first end configured to be attachable to the first tethering attachment assembly and a second end configured to be permanently or removably attachable to a stationary object. A second flexible connector has a first end configured to be attachable to the second tethering attachment assembly and a second end configured to be permanently or removably attachable to the first tethering attachment assembly. If the power tool falls and the battery pack becomes detached from the power tool, the first tethering attachment assembly and first flexible connector prevent the power tool from falling more than a first distance from the stationary object, and the second tethering attachment assembly and the second flexible connector prevent the battery pack from falling more than a second distance from the power tool.

Implementations of this aspect may include one or more of the following features. The first tethering attachment assembly may include a U-shaped member having first and second ends attachable to the power tool at first and second attachment points. The U-shaped member may include a coil configured to resiliently retain an elastic state with application of force up to a threshold force, and to permanently plastically deform above the threshold force. The U-shaped member may have first and second loops at its first and second ends and is attachable to the first and second attachment points by first and second fasteners passing through the first and second loops into the attachment points on the power tool. The first flexible connector may include a first tethering strap with first and second ends, the first end of the first tethering strap permanently or removably attachable to the first tethering attachment assembly and the second end of the first tethering strap permanently or removably attachable to a stationary object. The first flexible connector may be attachable to the first tethering attachment assembly by a first clip, and may be permanently or removably attachable to the stationary object by a second clip. The first and second clips may be first and second carabineers.

Alternatively, at least one of the first and second clips may be a quick release clip. The quick release clip may have a housing, a strap receptacle affixed to the housing, and a tethering attachment assembly pivotally connected to the housing and moveable between a closed position and an open position. The quick release clip may include a rod axially moveable in the housing between a closed position in which the rod engages an end portion of the tethering attachment assembly when in its closed position and an open position in which the rod is disengaged from the end portion of the tethering attachment assembly, enabling the tethering attachment assembly to pivot to its open position. The rod may be spring biased toward the closed position. The rod may be coupled to a latch that is moveable between a locked position in which latch prevents axial movement of the rod, an unlocked position in which the latch enables axial movement of the rod, and an open position in which the latch retracts the rod to its open position.

The second tethering attachment assembly may include a U-shaped plate having first and second ends attachable to first and second attachment points on the battery pack. The first and second ends of the U-shaped plate may be attachable to the battery pack by first and second fasteners that also secure two portions of a housing of the battery pack to one another. The U-shaped plate may be composed of a rigid material, such as plastic, metal, or carbon fiber. The second flexible connector may include a second tethering strap with first and second ends, the first end of the second tethering strap permanently or removably attachable to the second tethering attachment assembly and the second end of the second tethering strap permanently or removably attachable to the first tethering attachment assembly. The first end of the second tethering strap may be permanently attachable to the first tethering attachment assembly by a sewn loop. The second end of the second tethering strap may be permanently or removably attachable to the to the first tethering attachment assembly by a third clip, which may be a third carabineer.

A third flexible connector may have a first end configured to be permanently or removably attachable to the battery pack and a second end configured to be permanently or removably attachable to a stationary object, to facilitate changing the battery pack while the battery pack remains tethered to the stationary object. The first end of the third flexible connector may permanently or removably attachable to the battery pack by being permanently or removably attachable to the second flexible connector. The first end of the third flexible connector may be permanently or removably attachable to the second flexible connector by a fourth clip, which may be a carabineer. The second end of the third flexible connector may be permanently or removably attachable to the stationary object by a fifth clip, which may be a fifth carabineer.

In another aspect, a tethering system for a power tool battery pack includes a battery pack configured to be detachably coupled to a battery pack receptacle of a power tool and a tethering attachment assembly configured to be attachable to at least one attachment point on the battery pack, the battery pack being detachably couplable to a battery pack receptacle on the power tool. An elongated flexible connector has a first end configured to be attachable to the tethering attachment assembly and a second end configured to be permanently or removably attachable to the power tool or to a stationary object. If the battery pack becomes detached from the power tool or is dropped, the tethering attachment assembly and the flexible connector prevent the battery pack from falling by a distance from the power tool or from a stationary object.

Implementations of this aspect may include one or more of the following features. The flexible connector may include a tethering strap with first and second ends. The first end of the tethering strap may be permanently or removably attachable to the tethering attachment assembly and the second end of the first tethering strap permanently or removably attachable to the power tool or to the stationary object. The flexible connector may be attachable to the tethering attachment assembly by a first clip, and may be permanently or removably attachable to the power tool or to the stationary object by a second clip. The first and second clips may be first and second carabineers.

Alternatively, at least one of the first and second clips may be a quick release clip. The quick release clip may have a housing, a strap receptacle affixed to the housing, and a tethering attachment assembly pivotally connected to the housing and moveable between a closed position and an open position. The quick release clip may include a rod axially moveable in the housing between a closed position in which the rod engages an end portion of the tethering attachment assembly when in its closed position and an open position in which the rod is disengaged from the end portion of the tethering attachment assembly, enabling the tethering attachment assembly to pivot to its open position. The rod may be spring biased toward the closed position. The rod may be coupled to a latch that is moveable between a locked position in which latch prevents axial movement of the rod, an unlocked position in which the latch enables axial movement of the rod, and an open position in which the latch retracts the rod to its open position.

The tethering attachment assembly may be a U-shaped plate having first and second ends attachable to first and second attachment points on the battery pack. The U-shaped plate may be composed of a rigid material, such as plastic, metal, or carbon fiber. The first and second ends of the U-shaped plate may be attachable to the battery pack by first and second fasteners that also secure two portions of a housing of the battery pack to one another. In this way, the tethering attachment assembly may be retrofitted to an existing battery pack.

The system may further include the power tool, which may have a housing and the battery pack receptacle that receives the battery pack. A secondary tethering attachment assembly may be configured to be attachable to at least one attachment point on the power tool. The second end of the flexible connector may be permanently or removably attachable to the secondary tethering attachment assembly, e.g., by a clip such as a carabineer. A secondary flexible connector may have a first end configured to be permanently or removably attachable to the secondary tethering attachment assembly and a second end configured to be permanently or removably attachable to a stationary object.

The secondary tethering attachment assembly may comprise a U-shaped member having first and second ends attachable to the power tool at first and second attachment points. The U-shaped member may include a coil configured to resiliently retain an elastic state with application of force up to a threshold force, and to permanently plastically deform above the threshold force. The U-shaped member may have first and second loops at its first and second ends and is attachable to the first and second attachment points by first and second fasteners passing through the first and second loops into the attachment points on the power tool.

The secondary flexible connector may include a secondary tethering strap with first and second ends. The first end of the secondary tethering strap may be permanently or removably attachable to the secondary tethering attachment assembly and the second end of the secondary tethering strap may be permanently or removably attachable to a stationary object. The first end of the secondary tethering strap may be permanently attachable to the secondary tethering attachment assembly by a sewn loop. The second end of the secondary tethering strap may be permanently or removably attachable to the to the stationary object by a third clip, which may be a third carabineer.

In an implementation in which the flexible connector of the battery pack is permanently or removably attachable to the power tool, a third flexible connector may have a first end configured to be permanently or removably attachable to the battery pack and a second end configured to be permanently or removably attachable to a stationary object, to facilitate changing the battery pack while the battery pack remains tethered to the stationary object. The first end of the third flexible connector may be permanently or removably attachable to the battery pack by being permanently or removably attachable to the flexible connector. The first end of the third flexible connector may be permanently or removably attachable to the second flexible connector by a fourth clip, which may be a carabineer. The second end of the third flexible connector may be permanently or removably attachable to the stationary object by a fifth clip, which may be a fifth carabineer.

Advantages may include one or more of the following. A tethering system for a power tool and battery pack securely both tethers a power tool to a stationary object and a battery pack to the power tool or to a stationary object to prevent damage or injury if the power tool and/or battery pack falls or is dropped. In other implementations, a tethering system for a power tool battery pack securely tethers a battery pack to a power tool or to a stationary object to prevent damage or injury if the power tool and/or battery pack falls or is dropped. At the same time, the cordless power tool tethering system enables quick and easy changes of a battery pack while keeping the battery pack and the power tool tethered to a stationary object. In addition, the tethering system may be easily retrofitted to existing power tools and battery packs by using existing threaded fasteners and threaded openings that are on the power tools and battery packs. These and other advantages and features will be apparent from the description and the drawings.

DETAILED DESCRIPTION

Figure 2A:
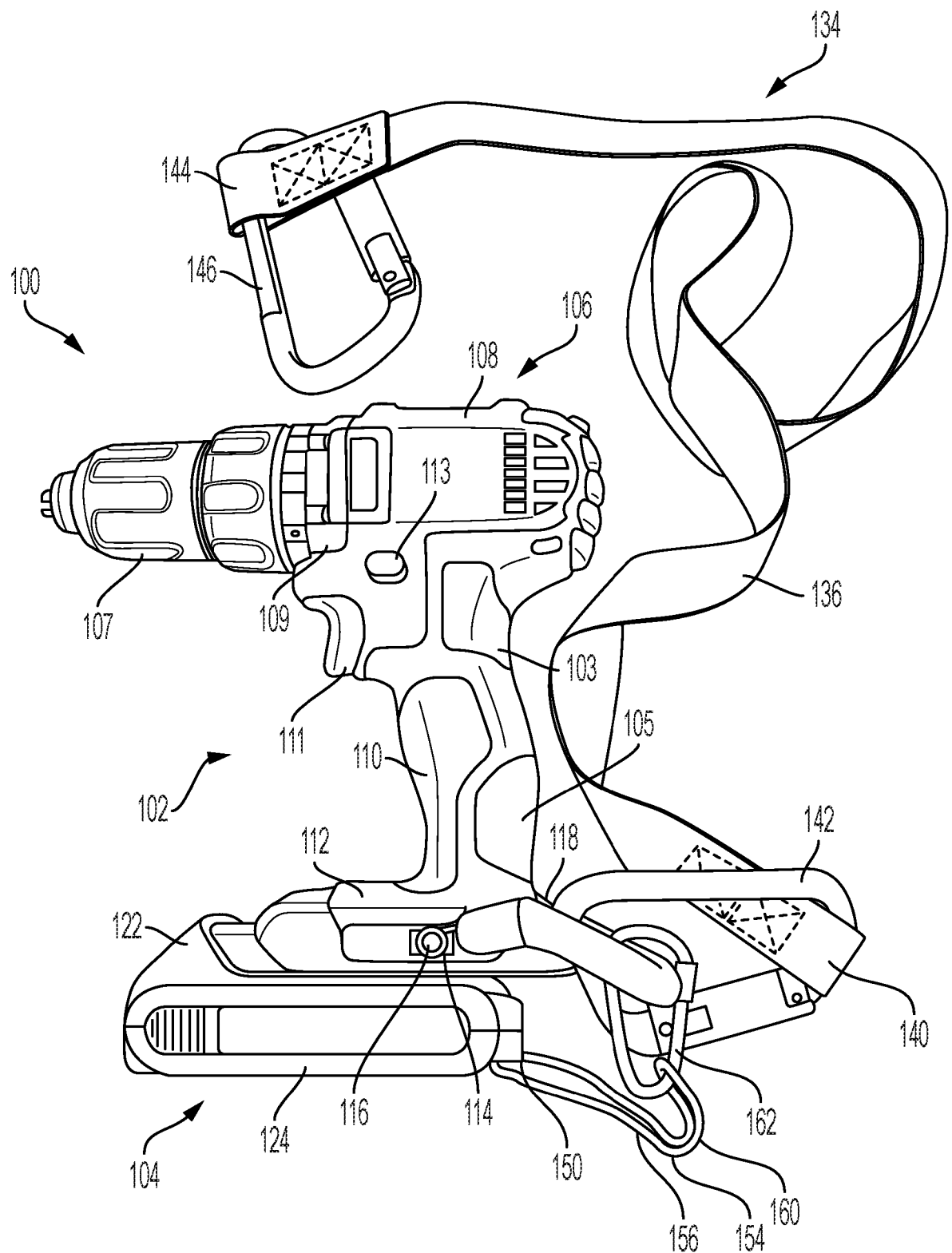
FIGS. 2A and 2B are side views of an exemplary embodiment of a cordless power tool tethering system.
Figure 2B:
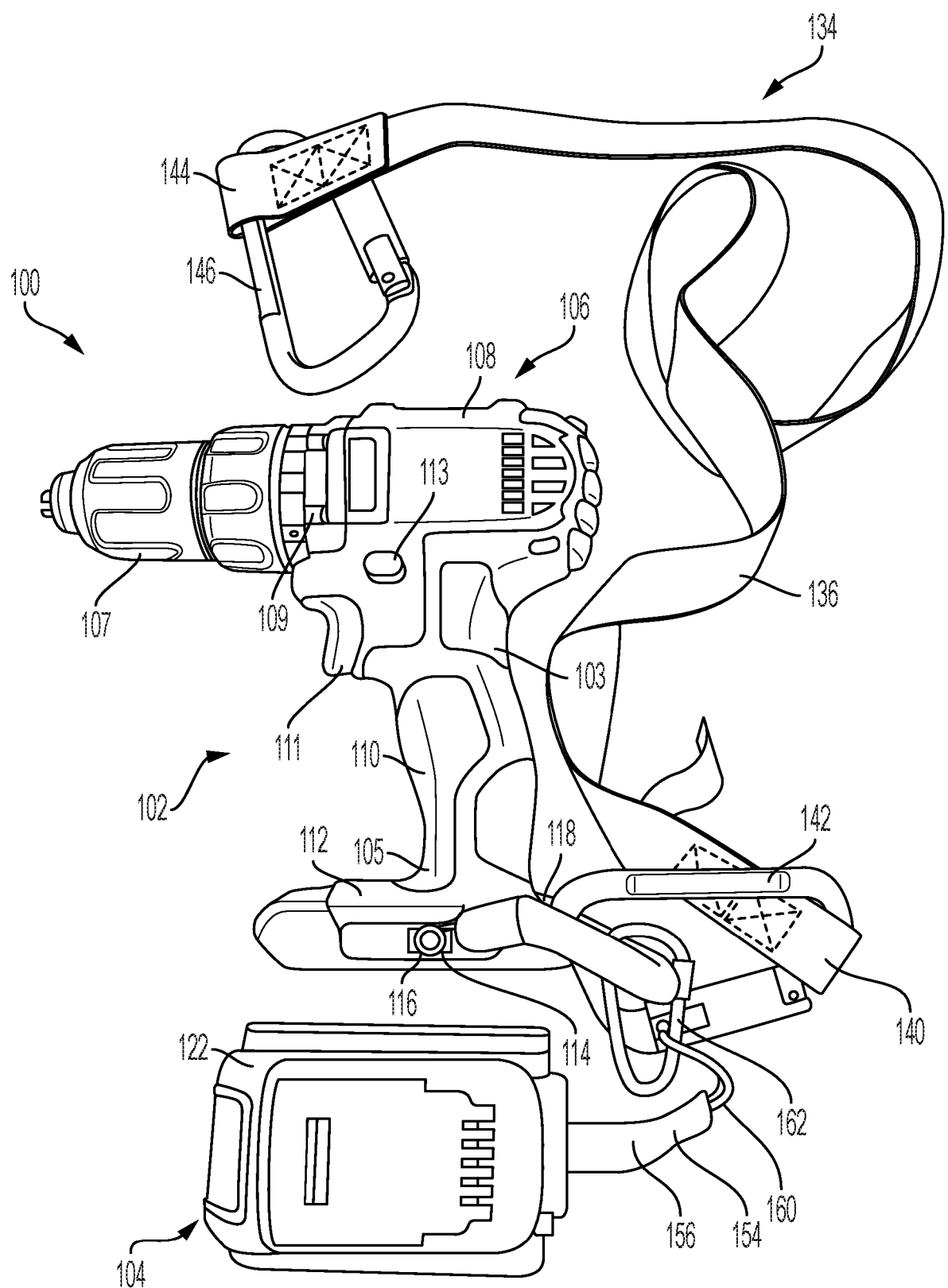

Referring to FIGS. 2A and 2B, in an exemplary embodiment, a cordless power tool tethering system 100 comprises a cordless power tool 102 powered by a detachable battery pack 104. The power tool 102 incudes a housing 106 comprising a motor housing 108, a transmission housing 109, a handle 110 having a proximal end 103 attachable to the motor housing 108, and a distal end 105 attachable to a battery pack receptacle 112. The motor housing 108 contains an electric motor (e.g., a permanent magnet brushless motor, not shown) and the transmission housing contains a transmission (e.g., a multi-stage planetary transmission, not shown) that drivingly couples the motor to a tool output spindle. The output spindle may be connected to a tool bit holder or chuck 107 or to another power tool working implement such as a saw blade holder, an abrasive wheel holder, or a nailer driving mechanism. The handle 110 includes a trigger switch 111 and a forward/reverse switch 113 coupled to internal electronic circuitry (not shown) to control power delivery to the motor. The battery pack receptacle 112 detachably and slidingly receives the battery pack 104. The battery pack receptacle 112 includes threaded apertures 114 on opposing sides of the receptacle 112 configured to removably receive threaded fasteners 116 for retaining a myriad of accessories such as belt clips, tool bit holders, lighting units, etc. The battery pack 104 includes a clamshell housing 120 composed of a top portion 122 and a bottom portion 124 fastened to one another by a pair of threaded bolts 126.

Figure 1A:
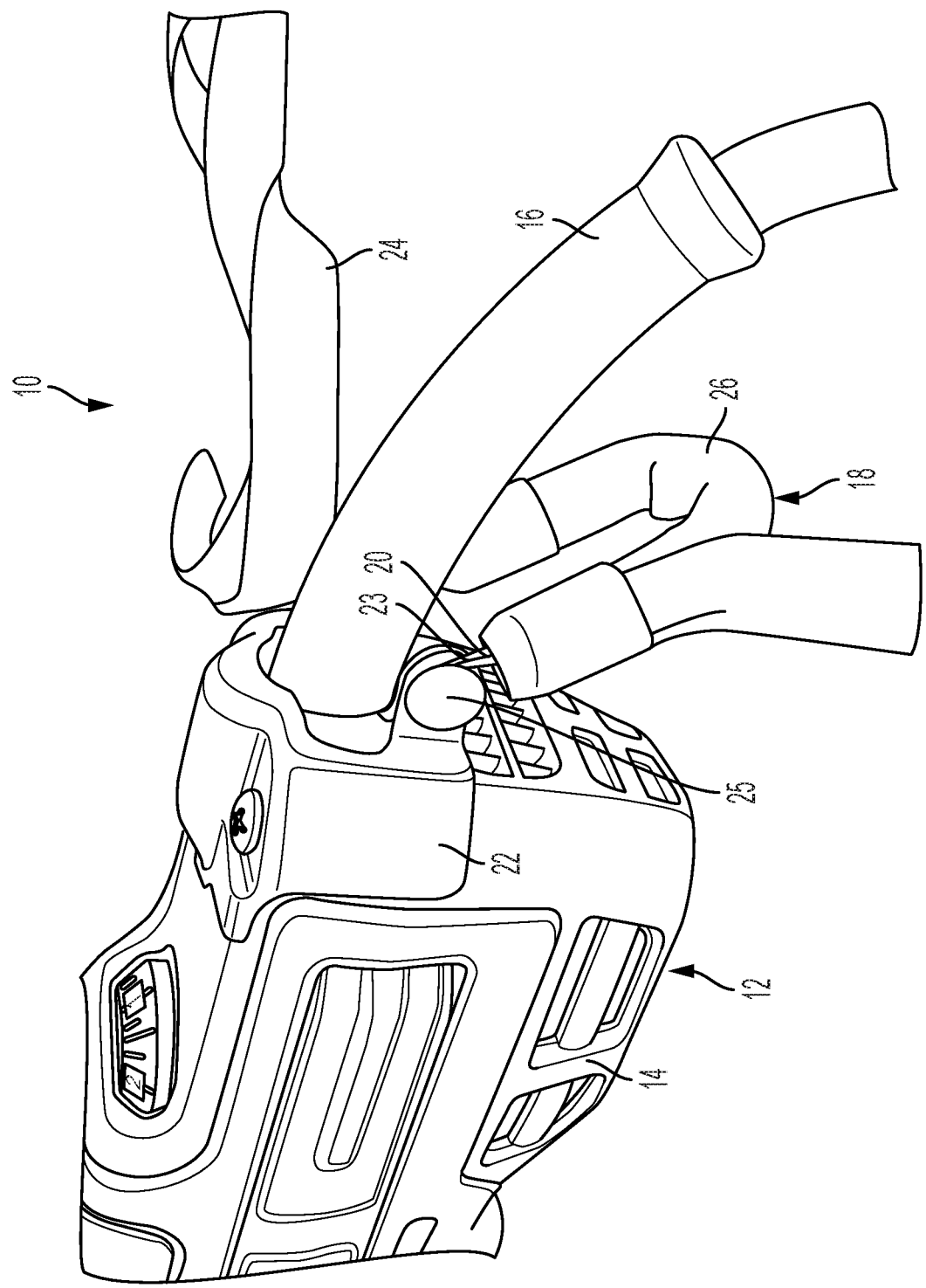
FIGS. 1A and 1B are perspective views of an exemplary corded power tool tethering system.
Figure 1B:
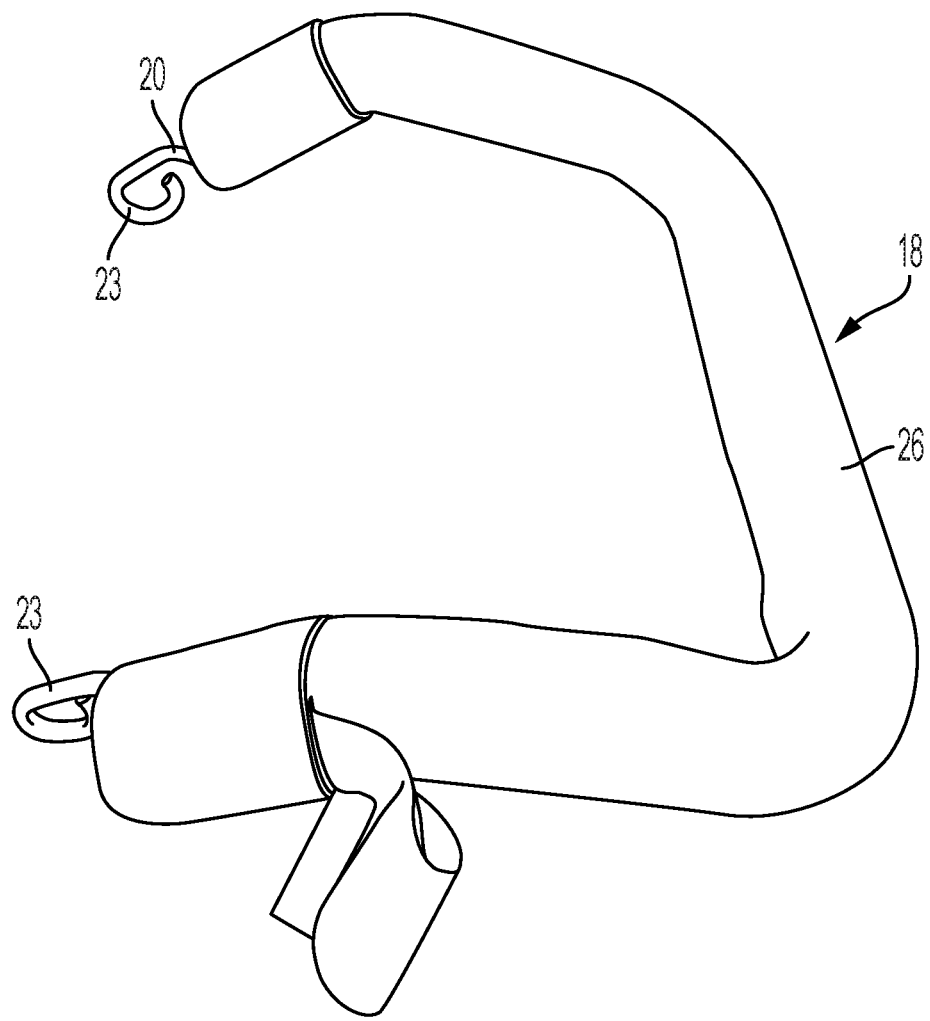
Figure 3:
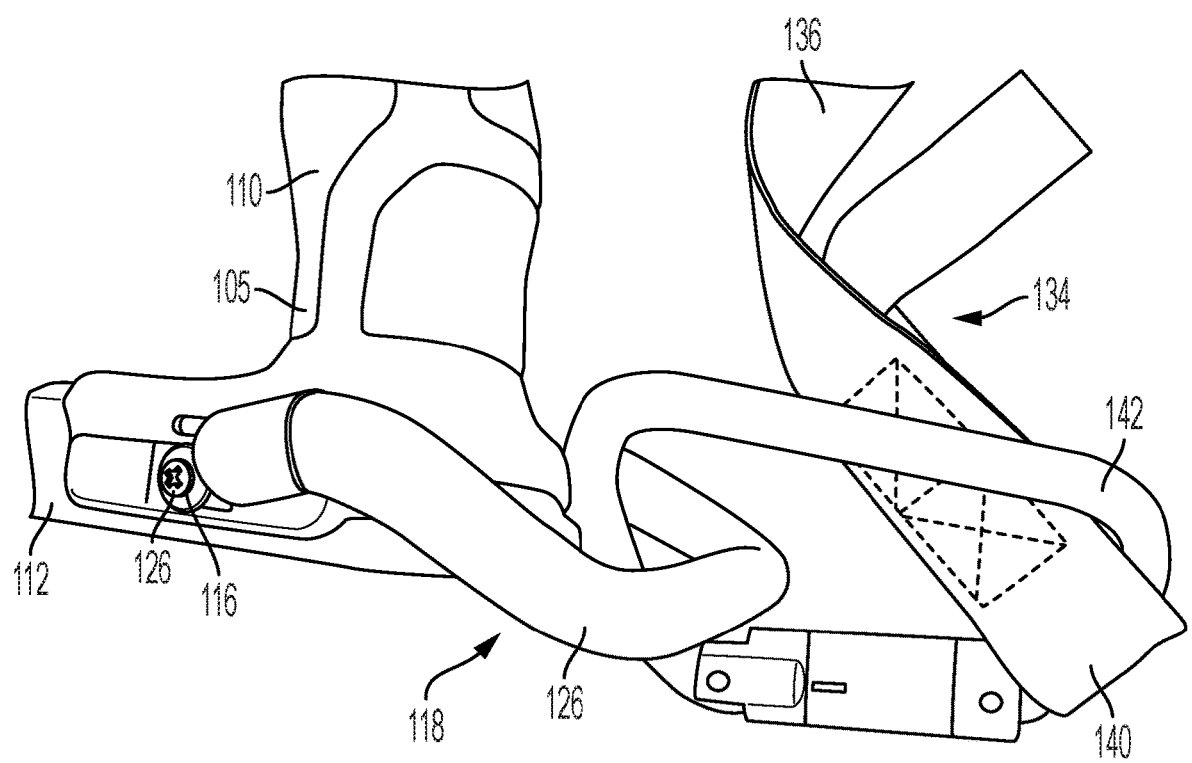
FIG. 3 is a close up perspective view of the battery pack receptacle, the first tethering attachment assembly, and the first flexible connector shown in FIGS. 2A and 2B.
Figure 4:
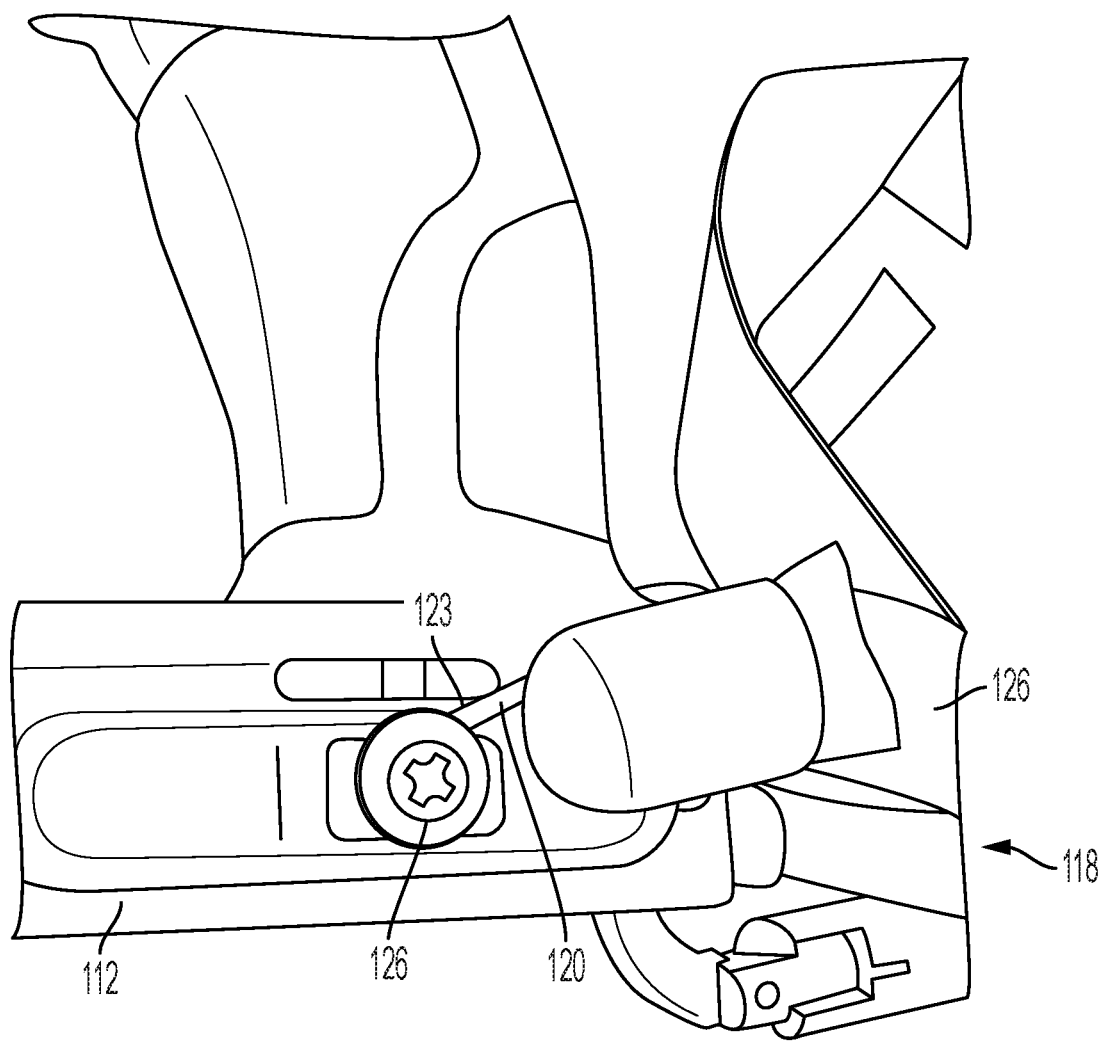
FIG. 4 is a close up side perspective view of the battery pack receptacle, the first tethering attachment assembly, and the first flexible connector shown in FIGS. 2A and 2B.

Referring also to FIGS. 3 and 4, a first tethering attachment assembly 118, similar to the tethering attachment assembly 18 of FIGS. 1A and 1B, is configured to be permanently or removably attachable to the battery pack receptacle 112. The first tethering attachment assembly 118 comprises a U-shaped elastic coil or spring element 120 covered by a nylon sleeve 126 with loops 123 at either end of the coil 120. Alternatively, the first tethering attachment assembly may comprise a rigid structure such as a plate, a rod, or a wire. The attachment tethering attachment assembly 118 is removably and pivotally attachable to the battery pack receptacle 112 by passing the threaded fasteners 116 through the loops 123 and into the threaded apertures 114 on the power tool 102 that are otherwise used for attaching a belt tethering attachment assembly to the power tool 102. In this way, the first tethering attachment assembly 118 may be easily retrofitted to existing power tools.

Together, the tethering attachment assembly 118 and the battery pack receptacle 112 form a closed shape. A first flexible connector 134 comprises a tethering strap 136 with a first end 140 and a second end 144. The first end 140 is permanently or removably attachable to the first tethering attachment assembly 118, e.g., by a first clip or carabineer 142. The second end 144 is permanently or removably attachable to a stationary object, e.g., by a second clip or carabineer 146 or by tying the second end 144 to the stationary object. If the tool 102 falls from a height, the tethering strap 136 and the first tethering attachment assembly 118 prevent the tool 102 from falling by a first distance approximately equal to a length of the first tethering strap 136.

Figure 5:
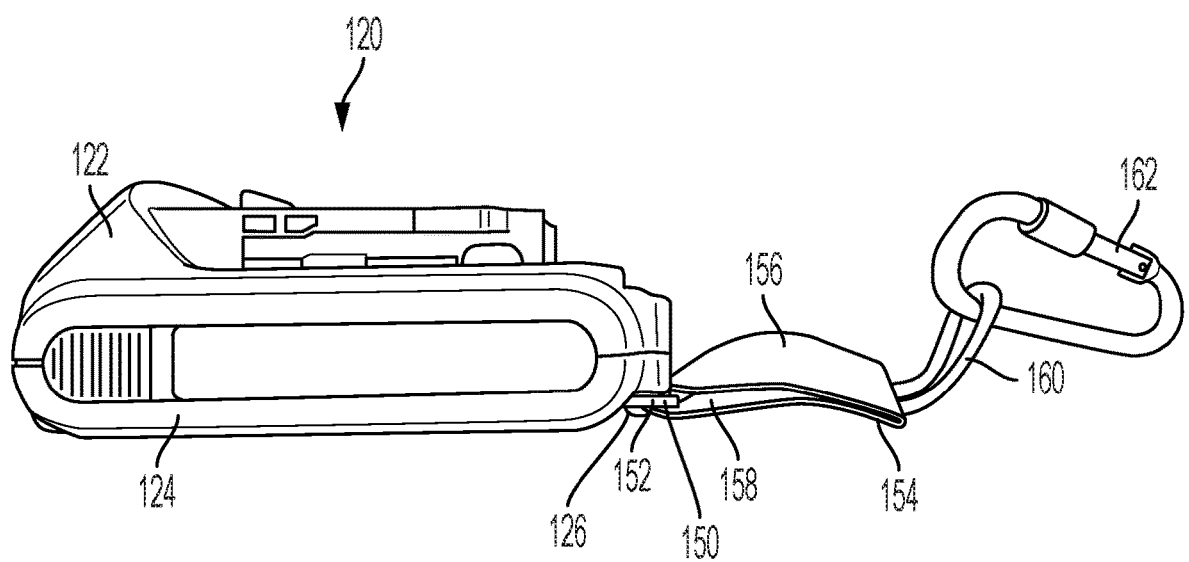
FIG. 5 is a close-up side view of the battery pack, the second tethering attachment assembly, and the second flexible connector shown in FIGS. 2A and 2B.
Figure 6:
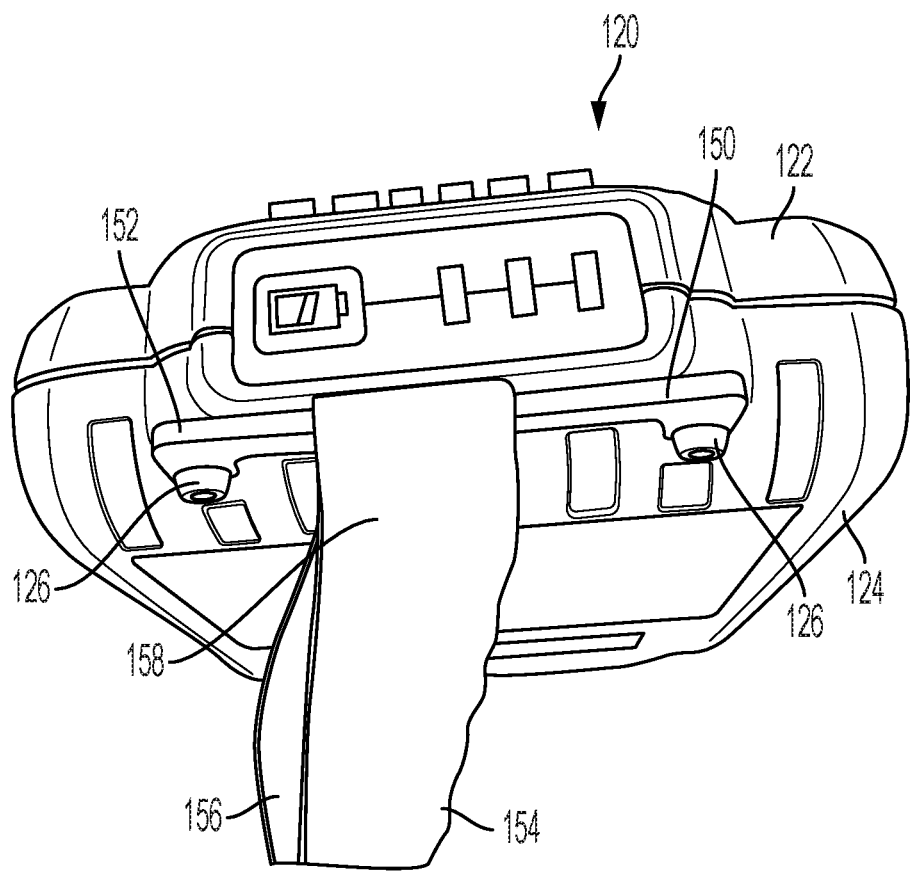
FIG. 6 is a close-up rear perspective view of the battery pack, the second tethering attachment assembly, and the second flexible connector shown in FIGS. 2A and 2B.
Figure 7:
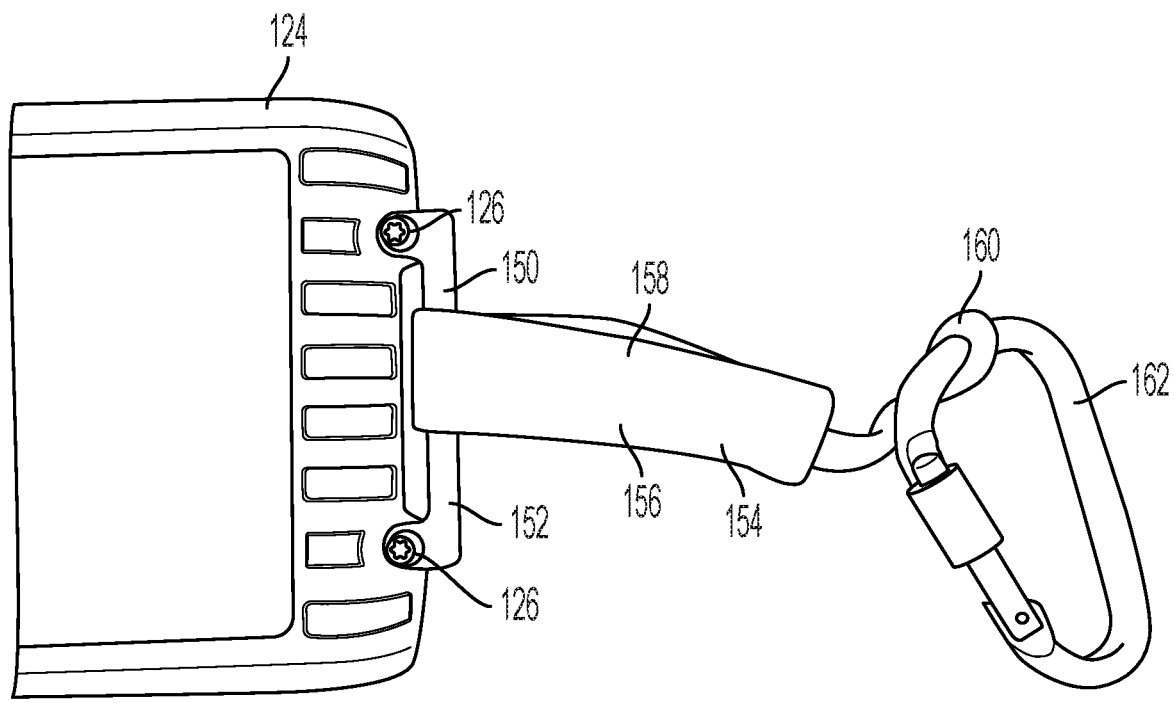
FIG. 7 is a close-up bottom view of the battery pack, the second tethering attachment assembly, and the second flexible connector shown in FIGS. 2A and 2B.

Referring also to FIGS. 5-7, a second tethering attachment assembly 150 is configured to be attachable to at least one attachment point on the battery pack 104. The second tethering attachment assembly 150 comprises a U-shaped plate 152 attachable to the battery pack housing 120 by the threaded bolts 126 that also fasten the top and bottom portions 122, 124 of the battery pack 104. In this way, the U-shaped plate 152 may be retrofitted to existing battery packs. The plate 152 may be composed of a rigid material such as metal (e.g., steel, aluminum, or titanium), hard plastic, and/or carbon fiber. A second flexible connector 154 comprises a second tethering strap 156 having a first end 158 permanently or removably attachable to the plate 152 and a second end 160 that can be permanently or removably attachable to the first tethering attachment assembly 118. In the depicted embodiment, the first end 158 permanently attachable to the plate 152 by a loop sewn around the second tethering attachment assembly 150. Alternatively, the first end 158 may be permanently or removably attachable to the second tethering attachment assembly 150, e.g., by a clip or carabineer, or by tying a knot around the second tethering attachment assembly 150. In the depicted embodiment, the second end 160 is permanently or removably attachable to the first tethering attachment assembly 118, e.g., by a third clip or carabineer 162.

Figure 8:
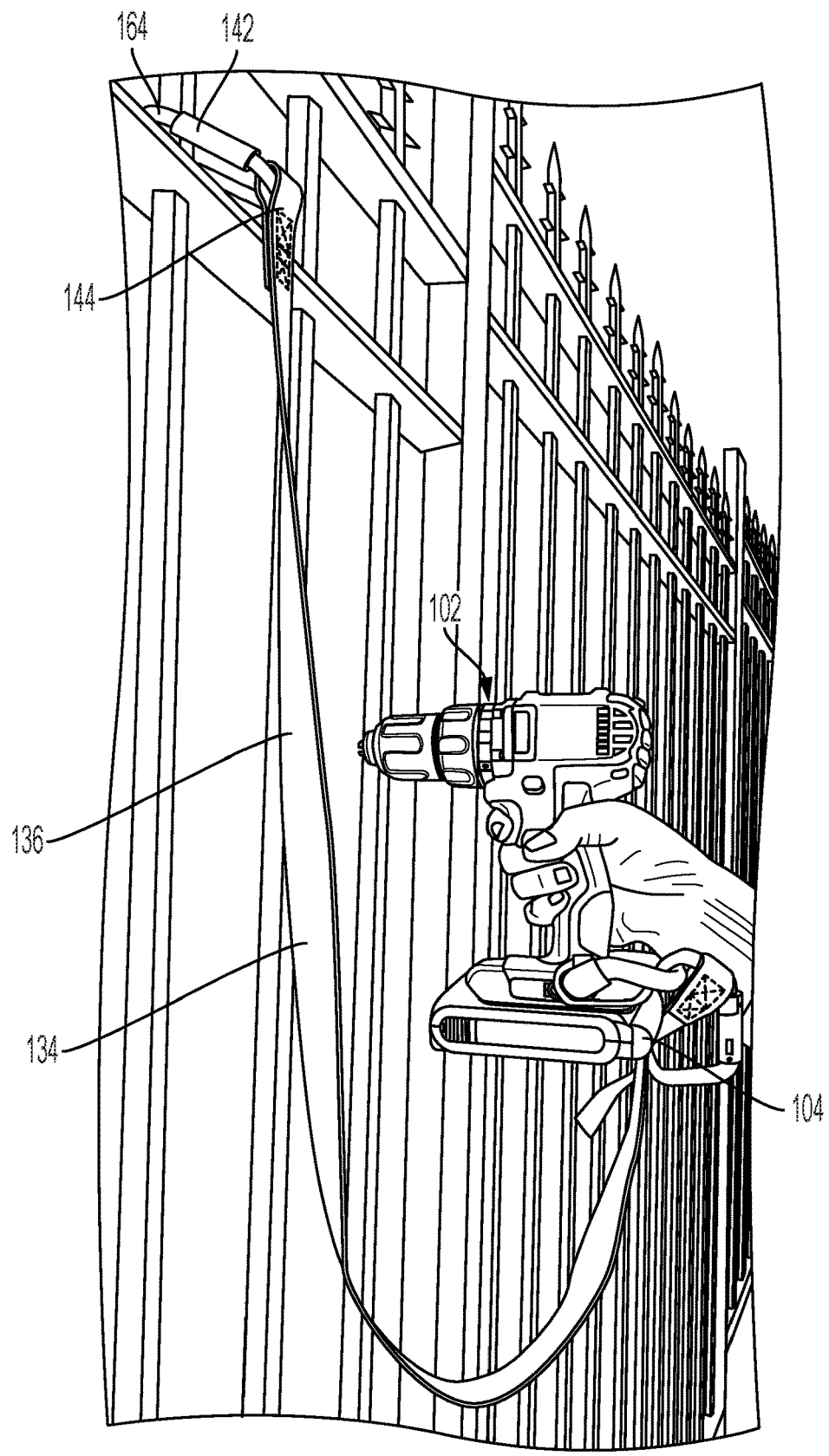
FIG. 8 is a perspective view of the system of FIGS. 2A and 2B in use by a user.
Figure 9:
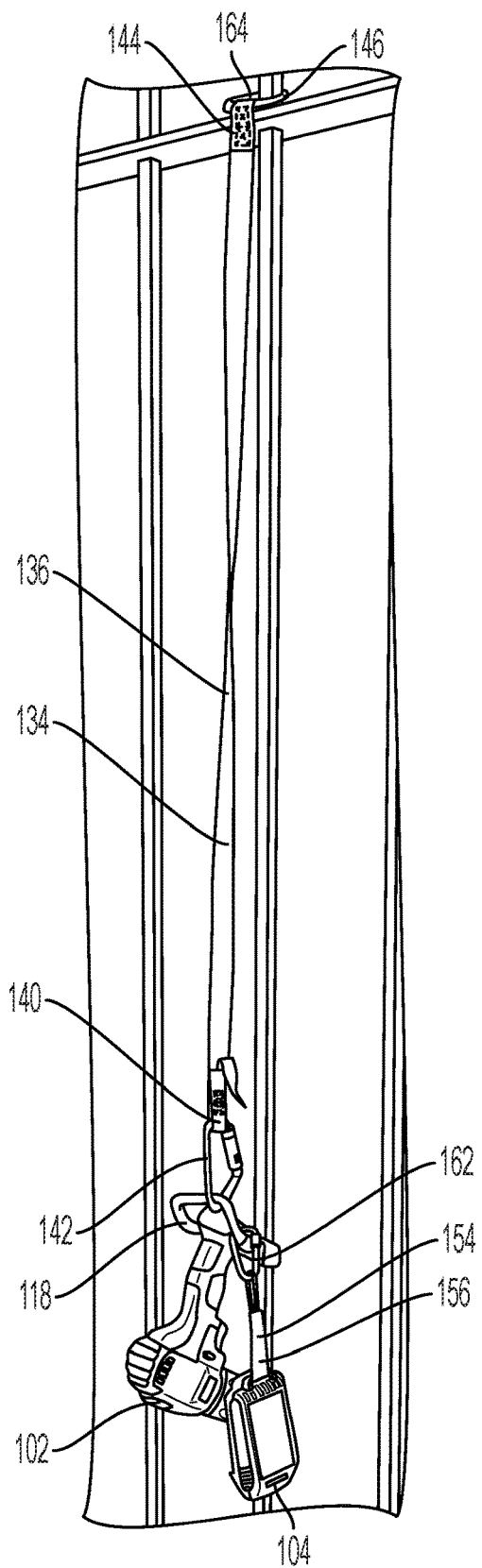
FIG. 9, is a perspective view of the system of FIGS. 2A and 2B in use by a user during a fall.
Figure 10:
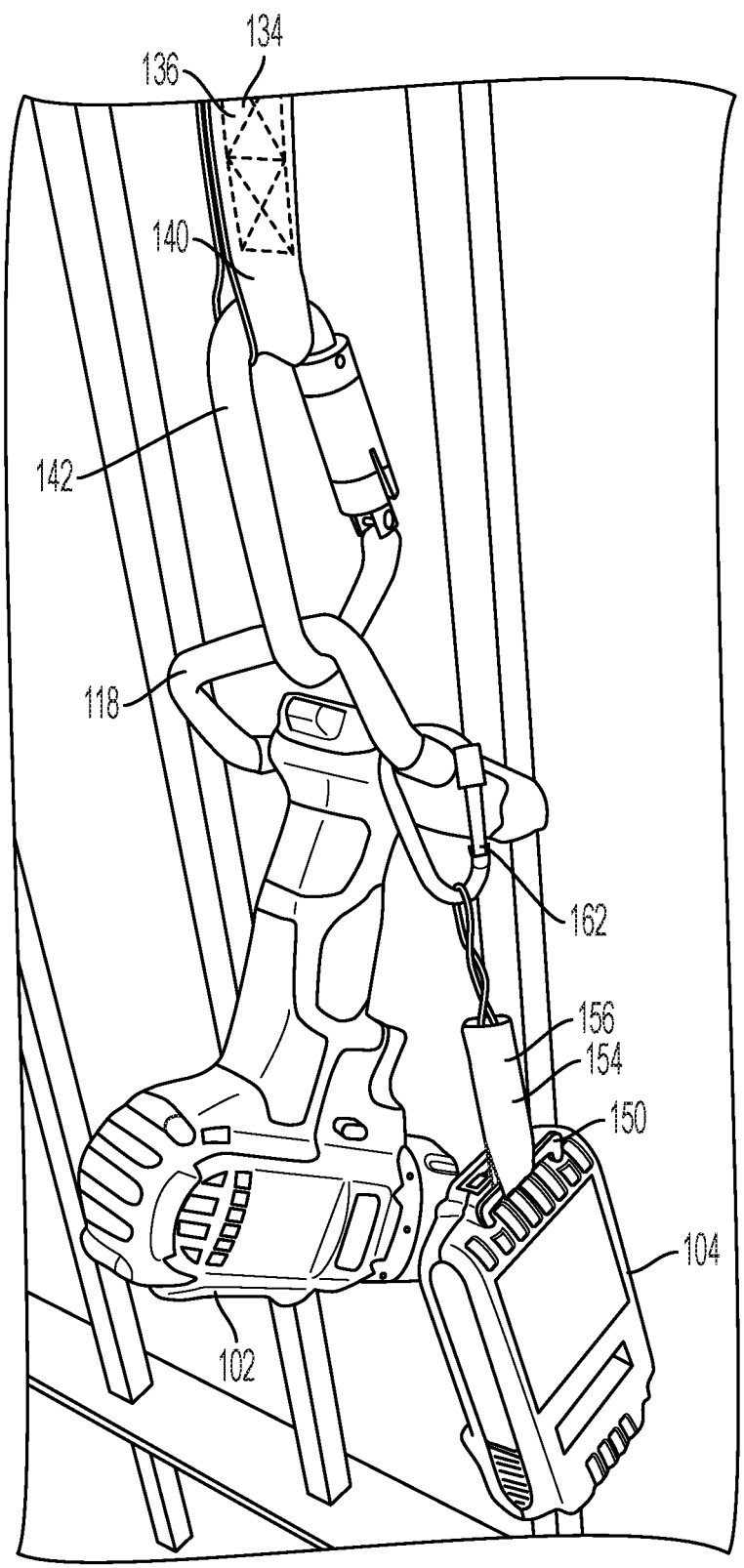
FIG. 10 is a close up perspective view of the system as shown in FIG. 9.
Figure 11:
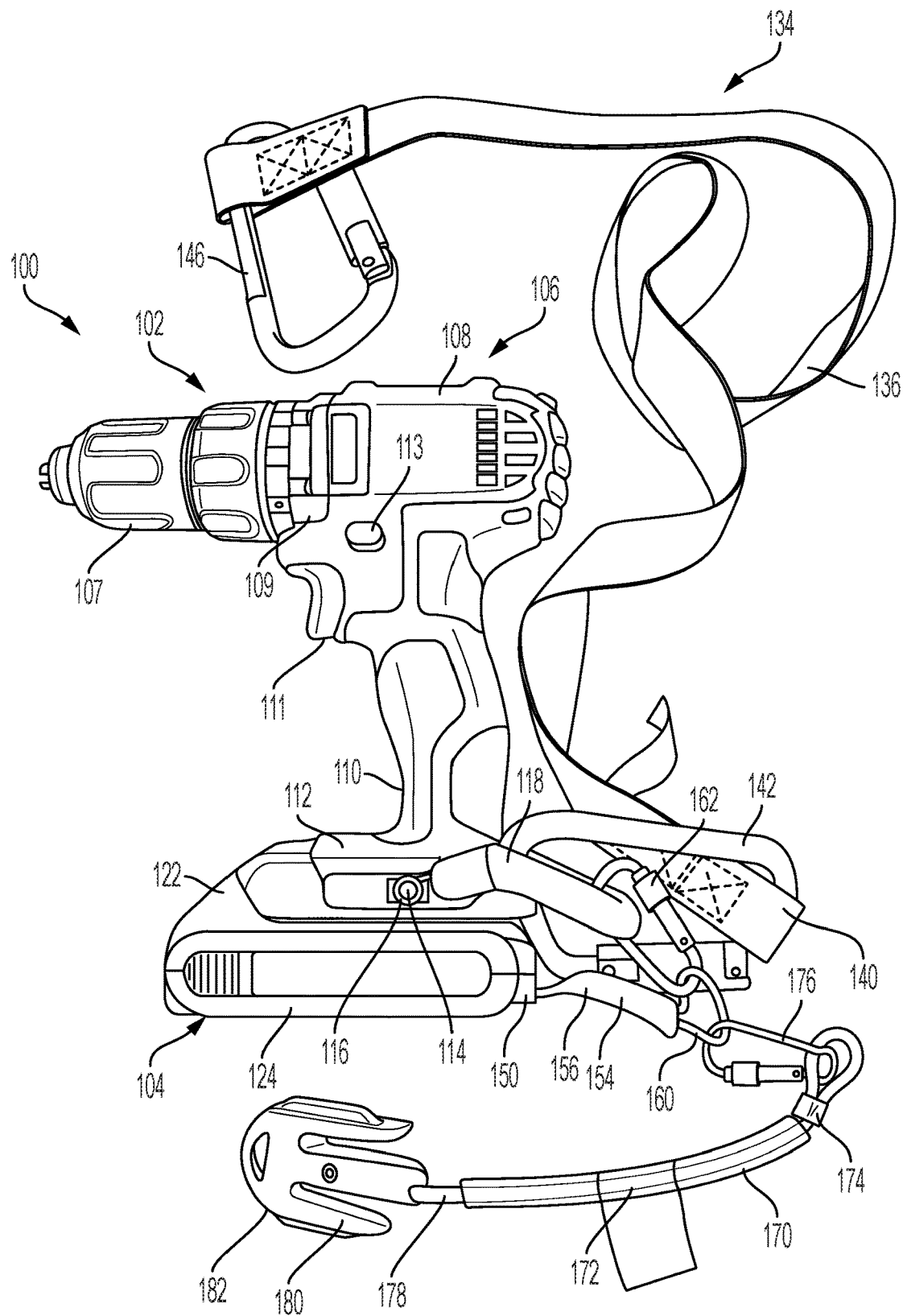
FIGS. 11-13 are side views another exemplary embodiment of a cordless power tool tethering system.

Referring also to FIGS. 8-10, in use, the power tool 102 can be tethered to a stationary object 164 by the first flexible connector 134, which is attachable to the first tethering attachment assembly 118 on the power tool 102, as described above. The battery pack 104 is tethered to the power tool 102 by the second flexible connector 154, which is attachable to the first tethering attachment assembly 118 on the power tool 102 and to the second tethering attachment assembly 150 on the battery pack 104, as described above. If the power tool 102 falls during use, the first flexible connector 134 and the first tethering attachment assembly 118 will prevent the power tool 102 from falling away from the stationary object 164 by more than a first distance this is approximately equal to the length of the first flexible connector 134. If, during a fall, the battery pack 104 becomes detached from the battery pack receptacle 112, the second flexible connector 154, the first tethering attachment assembly 104 and the second tethering attachment assembly 150 will prevent the battery pack from falling away from the power tool 102 by more than a second distance that is approximately equal to a length of the second flexible connector 154. During a fall, the coil or spring element 120 of the first tethering attachment assembly 118 may be configured to resiliently retain its elastic state with application of force up to a limit, and to permanently plastically deformed above a certain force, which reduces the strain and impact load on the power tool housing 14, as disclosed in U.S. Patent Application Publication No. 2017/0119137, which is incorporated by reference. Alternatively, the first tethering attachment assembly 118 may comprise a rigid member such as a rod, wire, or plate that does not deform.

Referring again to FIGS. 5-7, in another embodiment, the cordless power tool tethering system 100 may include only one tethering attachment assembly 150 that is configured to be attachable to at least one attachment point on the battery pack 104. The tethering attachment assembly 150 may comprise a U-shaped plate 152 attachable to the battery pack housing 120 by the threaded bolts 126 that also fasten the top and bottom portions 122, 124 of the battery pack 104. In this way, the U-shaped plate 152 may be retrofitted to existing battery packs. The plate 152 may be composed of a rigid material such as metal (e.g., steel, aluminum, or titanium), hard plastic, and/or carbon fiber. A single flexible connector 154 may comprise a tethering strap 156 having a first end 158 permanently or removably attachable to the plate 152 and a second end 160 that can be permanently or removably attachable to an existing power tool or to a stationary object. In the depicted embodiment, the first end 158 is permanently attachable to the plate 152 by a loop sewn around the second tethering attachment assembly 150. Alternatively, the first end 158 may be permanently or removably attachable to the second tethering attachment assembly 150, e.g., by a clip or carabineer, or by tying a knot around the second tethering attachment assembly 150. In the depicted embodiment, the second end 160 may be permanently or removably attachable to an existing power tool or to a stationary object by a third clip or carabineer 162.

Referring to FIGS. 11-14, in another embodiment, the cordless power tool tethering system 100 may additionally include a third flexible connector 170 configured to facilitate changing the battery pack while keeping the battery pack tethered to a stationary object. The third flexible connector 170 comprises a third tethering strap 172 with a first end 174 removably connected to the second end 160 of the second flexible connector 154, e.g., by a fourth clip or carabineer 176. Alternatively, the first end 174 of the third tethering strap 172 may be permanently or removably attachable directly to the second tethering attachment assembly 150 on the battery pack 104 or to the first end 158 of the second tethering strap 156. The third tethering strap 172 also includes a second end 178 that can be permanently or removably attachable to a stationary object, e.g., by a fifth carabineer or clip 180.

Figure 12:
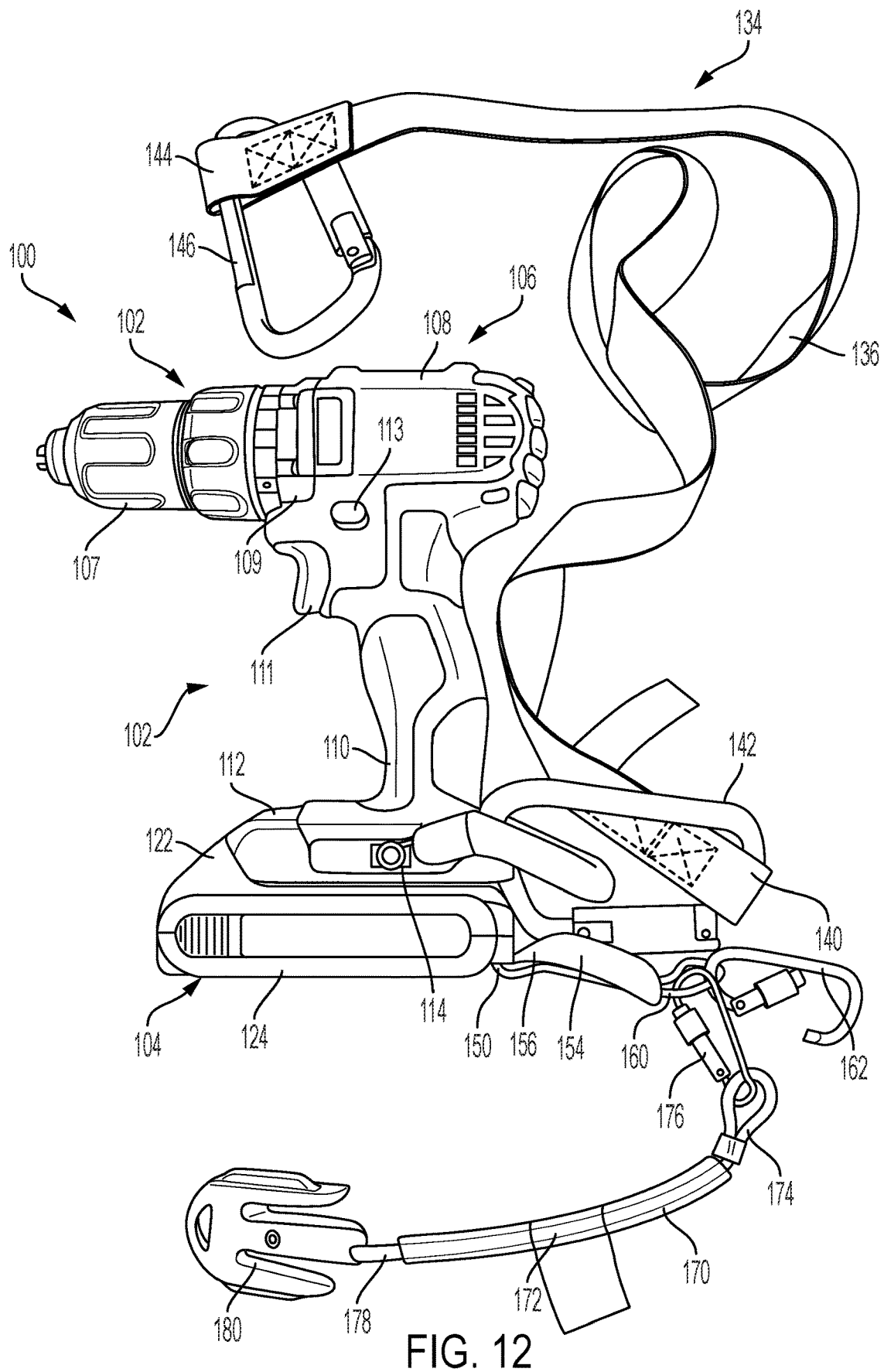
Figure 13:
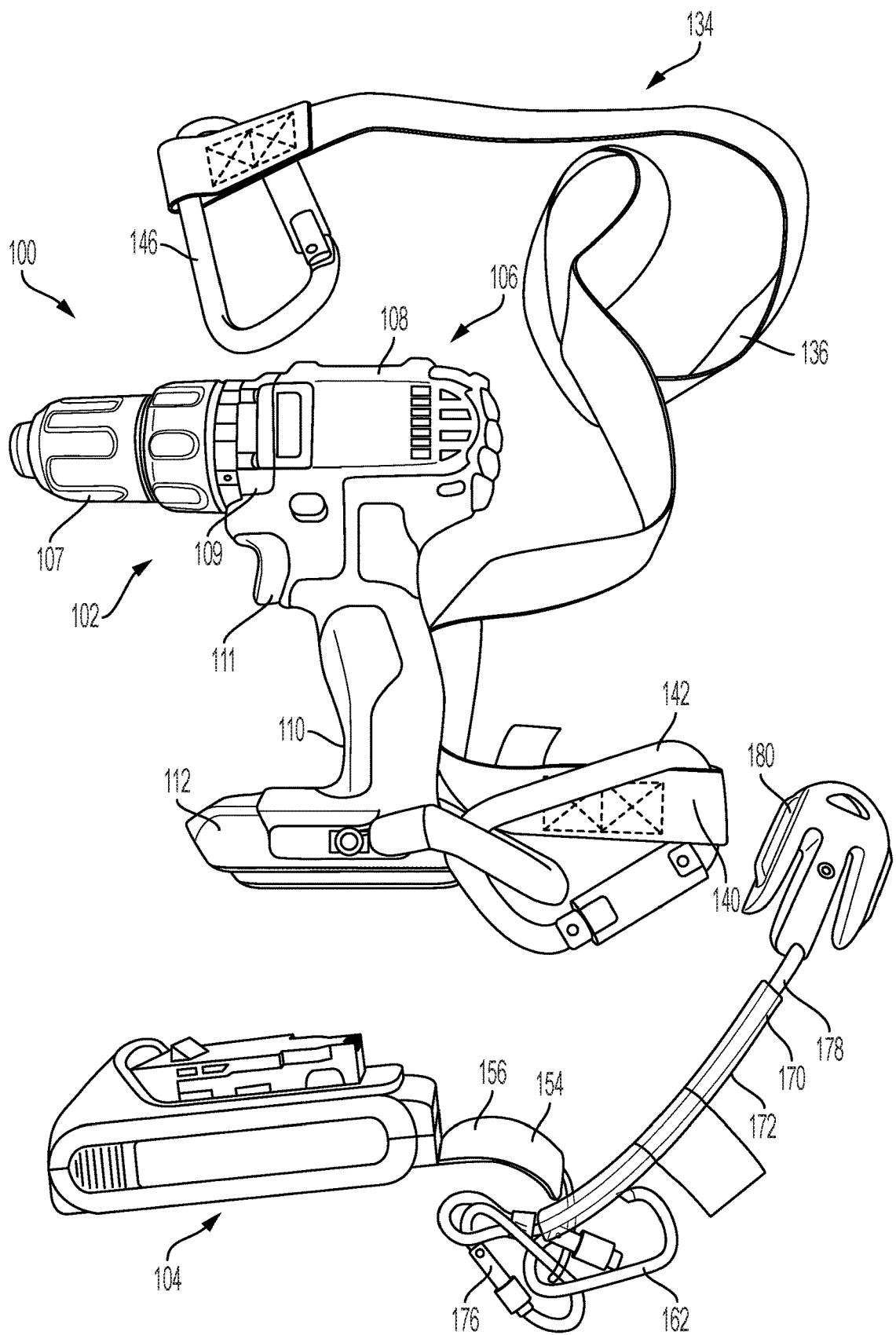

In use, when the user wishes to change the battery pack, the third flexible connector 170 is attachable at its first end 174 to the second flexible connector 154 by the fourth clip or carabineer 176 and at its second end 178 to a stationary object by the fifth carabineer or clip 180. Next, as shown in FIG. 12, the first end 160 of the second flexible connector 154 is detached from the first tethering attachment assembly 118 by unclipping the third clip or carabineer 162. Then, as shown in FIG. 13, the battery pack 104 is removed from the battery pack receptacle 112 while the battery pack 104 remains tethered to a stationary object by the second flexible connector 154 attachable to the battery pack 104 and the third flexible connector 170 attachable to the second flexible connector 154 and to the stationary object. The battery pack 104 and second flexible connector 154 can then be detached from the third flexible connector 170 and another, fresh battery pack 104 with its own second flexible connector 154 can be attachable to the third flexible connector 170. Finally, the above steps can be reversed to attach the fresh battery pack 104 to the power tool 102.

Figure 14:
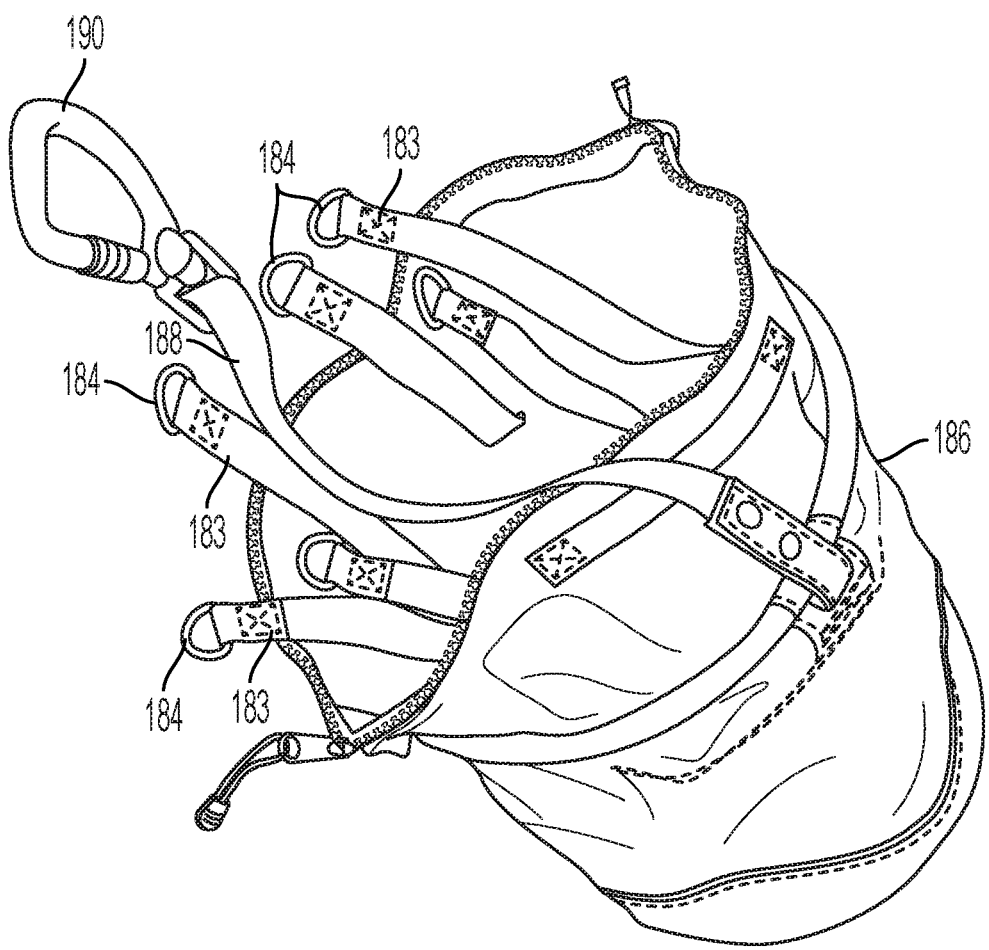
FIG. 14 is a perspective view of a lift bucket for use with the aforementioned tethering systems.

In the illustrated examples, the clips 142, 146, 162, 176 are well-known carabineers that can be operated as known in the art, and the clip 180 is a Skyhook™ Switch Connector 182 sold by Proto Industrial Tools. The Skyhook™ Switch Connector 182 may be quickly and securely attachable to a round or D-shaped ring. For example, as shown in FIG. 14, the Skyhook™ Switch Connector 182 can be quickly, releasably, and securely attachable to one of a plurality of D-shaped rings 184, each of which is affixed to a strap 183. Each strap 183 is securely attachable to, e.g., a Tethering D-Ring Lift Bucket 186 sold by Proto Industrial Tools. The Lift Bucket 186 also includes a tethering strap 188 and carabineer 190 that may securely connect the Lift Bucket 186 to a stationary object. The carabineers and Skyhook™ Switch Connectors may be substituted or exchanged for one another.

Figure 15C:
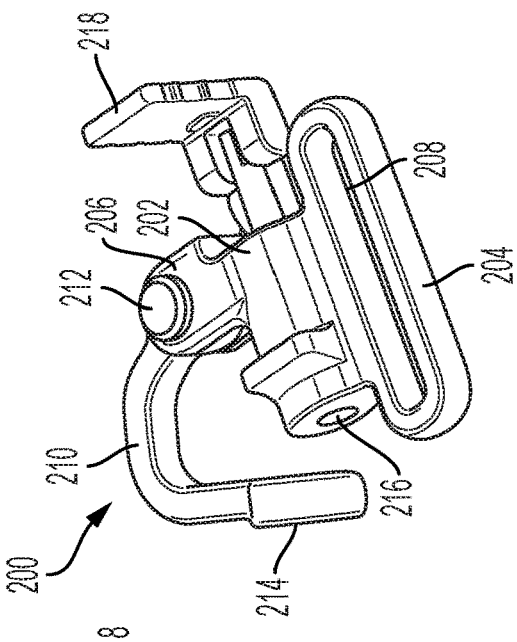
FIGS. 15A-15C are perspective views of a quick-release clip for use with the aforementioned tethering systems.
Figure 15B:
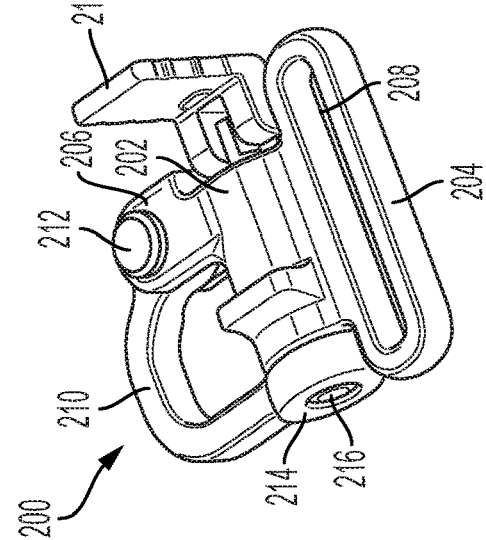
Figure 15A:
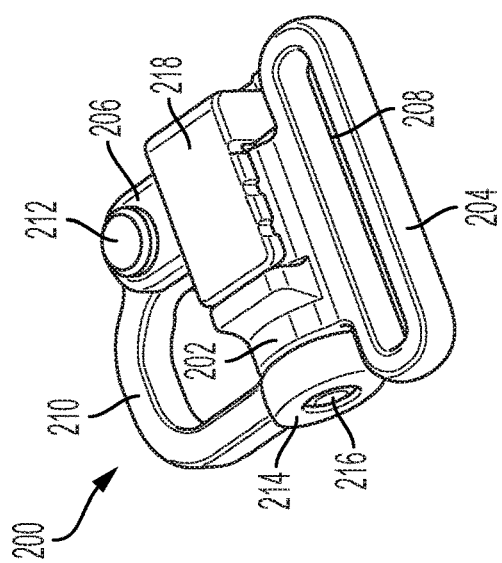

Referring to FIGS. 15A-15C, in other embodiments, any of the aforementioned carabineers or Skyhook™ Switch Connectors may be replaced with a quick release clip 200. The quick-release clip 200 comprises a cylindrical housing 202 with an elongated strap receptacle 204 affixed to one transverse side of the housing and a boss 206 affixed to and projecting from an opposite transverse side of the housing 202. The strap receptacle 204 includes an elongated aperture 208 configured to receive an end of a tethering strap (not shown) that is fed through the aperture 208 and sewn together to form a closed, secure connection. A J-shaped hook 210 has one end pivotally connected to the boss 206 by a pivot pin 212 and an opposite end with a eyelet 214. The hook 210 can pivot about the pivot pin 212 between a closed position (FIG. 15A) in which the eyelet abuts against the cylindrical housing 202 and an open position (FIG. 15C), in which the eyelet is disposed away from the cylindrical housing 202.

A cylindrical rod 216 is received in the cylindrical housing 202 and is axially moveable along an axis of the housing 202 between a closed position (FIG. 15A) in which a front end of the rod 216 engages the eyelet 214 and an open position (FIG. 15C) in which the front of the rod 216 is retracted into the housing 202. The rod 216 is spring biased toward the closed position, and is coupled to a latch 218. The latch 218 is pivotable between a locked position (FIG. 15A) in which latch prevents axial movement of the rod 216. an unlocked position (FIG. 15B) in which the latch 218 enables axial movement of the rod 216, and an open position (FIG. 15C), in which the latch 218 is pulled away from the housing 202 to retract the rod 216.

In use, one of the aforementioned tethering straps may be attachable to the strap receptacle 204, while the clip 200 may be releasably but securely attachable to another object (e.g., to the U-shaped tethering attachment assembly 118 on the battery receptacle or to a stationary object). To attach the clip 200 to an object, the latch 218 is pivoted from the locked position (FIG. 15A) to the unlocked position (FIG. 15B), and then pulled away from the housing 202 (FIG. 15C) to retract the rod 216 out of the eyelet 214 of the J-shaped hook 210. This enables the J-shaped hook 210 to be pivoted away from the housing 202, so that the object may be received in the J-shaped hook. Once the object is received in the J-shaped hook, the J-shape hook 210 is moved to its closed position, the latch 218 is released causing the rod to spring back and engage the eyelet 216, and the latch 218 is pivoted to its locked position (FIG. 15A) to keep the J-shaped hook 210 closed around the object. It should be understood that the above-described clips, carabineers, Skyhook™ Switch Connectors, and quick release clip 200 may be substituted or replaced with one another.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. For example, the first tethering attachment assembly and second tethering attachment assemblys can be attachable by a single attachment point, can be form opened or closed shapes, and can comprise a rigid, elastic, flexible, or semi-flexible members, such as cords, plates, rods, wires, and springs. The flexible connectors could have other flexible or semi-flexible forms such as lanyards, cords, rods, ropes, wires, strings, and springs. In addition, although the specification discloses carabineers used as clips for attaching the ends of the flexible connectors, other mechanical devices may be used such as tying knots or bows, spring clips, quick-release connectors, threaded fasteners, screws, bolts, and rivets. These and other implementations are within the scope of this application.

What is claimed is:

1. A tethering system for a cordless power tool comprising:
   a first tethering attachment assembly configured to be attachable to at least one attachment point on a power tool;
   a rigid second tethering attachment assembly configured to be removably attachable to at least one attachment point on a battery pack by a fastener that also couples a first housing portion of the battery pack to a second housing portion of the battery pack, the battery pack being detachably couplable to a battery pack receptacle on the power tool;
   a first flexible connector having a first end configured to be attachable to the first tethering attachment assembly and a second end configured to be attachable to a stationary object;
   a second flexible connector having a first end configured to be attachable to the second tethering attachment assembly and a second end configured to be attachable to the first tethering attachment assembly,
   wherein, if the power tool falls and the battery pack becomes detached from the power tool, the first tethering attachment assembly and first flexible connector prevent the power tool from falling more than a first distance from the stationary object, and the second tethering attachment assembly and the second flexible connector prevent the battery pack from falling more than a second distance from the power tool.

2. The system of claim 1, wherein the first tethering attachment assembly comprises a U-shaped member having first and second ends attachable to the power tool at first and second attachment points.

3. The system of claim 2, wherein the U-shaped member comprises a coil configured to resiliently retain an elastic state with application of force up to a threshold force, and to permanently plastically deform above the threshold force.

4. The system of claim 1, wherein the first flexible connector comprises a first tethering strap with first and second ends, the first end of the first tethering strap attachable to the first tethering attachment assembly and the second end of the first tethering strap attachable to a stationary object.

5. The system of claim 4, wherein the first flexible connector is attachable to the first tethering attachment assembly by a first clip, and is attachable to the stationary object by a second clip.

6. The system of claim 5, wherein each of the first and second clips comprises at least one of a carabineer and quick release clip.

7. The system of claim 6, wherein the quick release clip comprises a housing, a strap receptacle affixed to the housing, and a hook pivotally connected to the housing and moveable between a closed position and an open position.

8. The system of claim 7, wherein the quick release clip further comprises a rod axially moveable in the housing between a closed position in which the rod engages an end portion of the hook when in the hook is in the closed position and the rod may be disengaged from the hook to enable the hook to pivot to the open position.

9. The system of claim 1, wherein the second tethering attachment assembly comprises a U-shaped plate having first and second ends attachable to first and second attachment points on the battery pack.

10. The system of claim 1, wherein the second flexible connector comprises a second tethering strap with first and second ends, the first end of the second tethering strap attachable to the second tethering attachment assembly and the second end of the second tethering strap attachable to the first tethering attachment assembly.

11. The system of claim 10, wherein the first end of the second tethering strap is attachable to the to the first tethering attachment assembly by a third clip.

12. The system of claim 1, further comprising a third flexible connector having a first end configured to be attachable to the battery pack and a second end configured to be attachable to a stationary object, to facilitate changing the battery pack while the battery pack remains tethered to the stationary object.

13. A tethering system for a cordless power tool comprising:
a battery pack configured to be detachably coupled to a battery pack receptacle of a power tool, the battery pack including a first housing portion and a second housing portion coupled to the first housing portion by a threaded fastener;
a rigid tethering attachment assembly including a plate configured to be removably attachable to at least one attachment point on one of the first or second housing portion of the battery pack by the threaded fastener, which passes through an opening in the plate, the battery pack being detachably couplable to a battery pack receptacle on the power tool;
an elongated flexible connector having a first end configured to be attachable to the tethering attachment assembly and a second end configured to be attachable to the power tool or to a stationary object,
wherein, if the battery pack becomes detached from the power tool, the tethering attachment assembly and the flexible connector prevent the battery pack from falling by a distance from the power tool.

14. The system of claim 13, wherein the flexible connector comprises a tethering strap with first and second ends, the first end of the tethering strap attachable to the tethering attachment assembly and the second end of the first tethering strap attachable to the power tool or to the stationary object.

15. The system of claim 14, further comprising, the power tool having a housing and the battery pack receptacle.

16. The system of claim 13, wherein the flexible connector is attachable to the tethering attachment assembly by a first clip, and is attachable to the power tool or to the stationary object by a second clip.

17. The system of claim 16, wherein the first and second clips each comprise at least one of a carabineer and a quick-release clip.

18. The system of claim 13, wherein the tethering attachment assembly comprises a U-shaped plate having first and second ends attachable to first and second attachment points on the battery pack.

19. The system of claim 13, further comprising another tethering attachment assembly configured to be attachable to at least one attachment point on the power tool and a another flexible connector having a first end configured to be attachable to the tethering attachment assembly on the battery pack and a second end configured to be attachable to a stationary object.

20. A tethering system for a cordless power tool comprising:
a power tool having a battery receptacle;
a battery pack configured to be detachably coupled to a battery pack receptacle of a power tool, the battery pack including a first housing portion and a second housing portion coupled to the first housing portion by a fastener;
a first U-shaped tethering attachment assembly attachable to the power tool;
a rigid second U-shaped tethering attachment assembly removably attachable to the battery pack by the fastener;
a first tethering strap having a first length, a first end configured to be attachable to the first tethering attachment assembly, and a second end configured to be attachable to a first stationary object;
a second flexible connector having a second length, a first end configured to be attachable to the second tethering attachment assembly, and a second end configured to be attachable to the first tethering attachment assembly;
a third flexible connector having a first end configured to be attachable to one of the battery pack and the second flexible connector, and a second end configured to be attachable to a second stationary object to facilitate changing the battery pack while the battery pack remains tethered to the second stationary object,
wherein, if the power tool falls and the battery pack becomes detached from the power tool, the first tethering attachment assembly and first flexible connector prevent the power tool from falling more than a first distance from the first stationary object, and the second tethering attachment assembly and the second flexible connector prevent the battery pack from falling more than a second distance from the power tool.

* * * * *